April 1, 1941.  E. F. BRANDES  2,236,562
TURF CUTTER
Filed Feb. 10, 1939  3 Sheets-Sheet 1

INVENTOR
ERNEST F. BRANDES
BY
Bohlbert & Ledbetter
ATTORNEYS

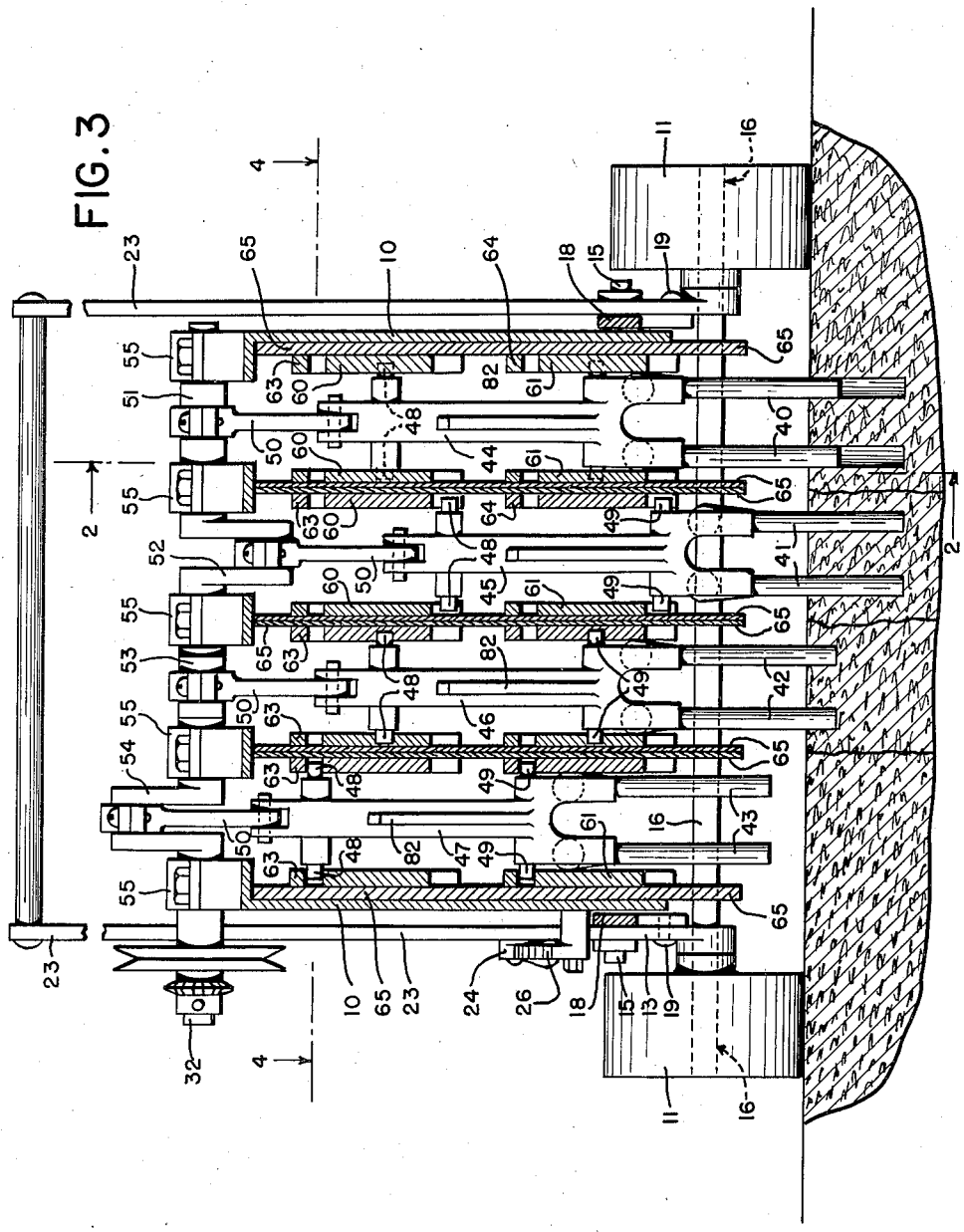

April 1, 1941.　　　E. F. BRANDES　　　2,236,562
TURF CUTTER
Filed Feb. 10, 1939　　　3 Sheets-Sheet 3

INVENTOR
ERNEST F. BRANDES
BY
ATTORNEYS

Patented Apr. 1, 1941

2,236,562

UNITED STATES PATENT OFFICE 2,236,562

TURF CUTTER

Ernest F. Brandes, Manhasset, N. Y.

Application February 10, 1939, Serial No. 255,648

14 Claims. (Cl. 97—44)

The invention relates to a turf cutter by means of which an area of turf, such as a golf green, may be punched full of holes. These holes are small enough so that the normal resiliency of the grass of the turf or on the green causes the grass to spread out and cover the holes at the surface and hence a level playing surface remains. The invention provides a machine having turf punches which perforate an area of turf with holes in an expeditious and effective manner without affecting the smoothness of the turf area.

It is an object of the invention to construct a new and novel turf cutter which enables a turf area, such as a golf green, to be perforated with holes which are too small to affect the playing surface of the green.

Another object of the invention is to construct new and novel means in a turf cutter for causing the turf punches thereof to remain in the same vertical plane during the punching and withdrawal stroke when the carriage or frame of the turf cutter moves slowly forward.

Another object is to construct a new and novel turf cutter which is simple in construction, whereby the machine can be cheaply manufactured and in a relatively small size.

Other objects of the invention will be more apparent from the following description, taken in connection with the accompanying drawings illustrating a preferred embodiment of the invention, in which:

Figure 3 is a section through the turf cutter approximately at the center of its main frame, but also in the planes of the turf punches and the reciprocating frames carrying the same.

Figures 1, 2:
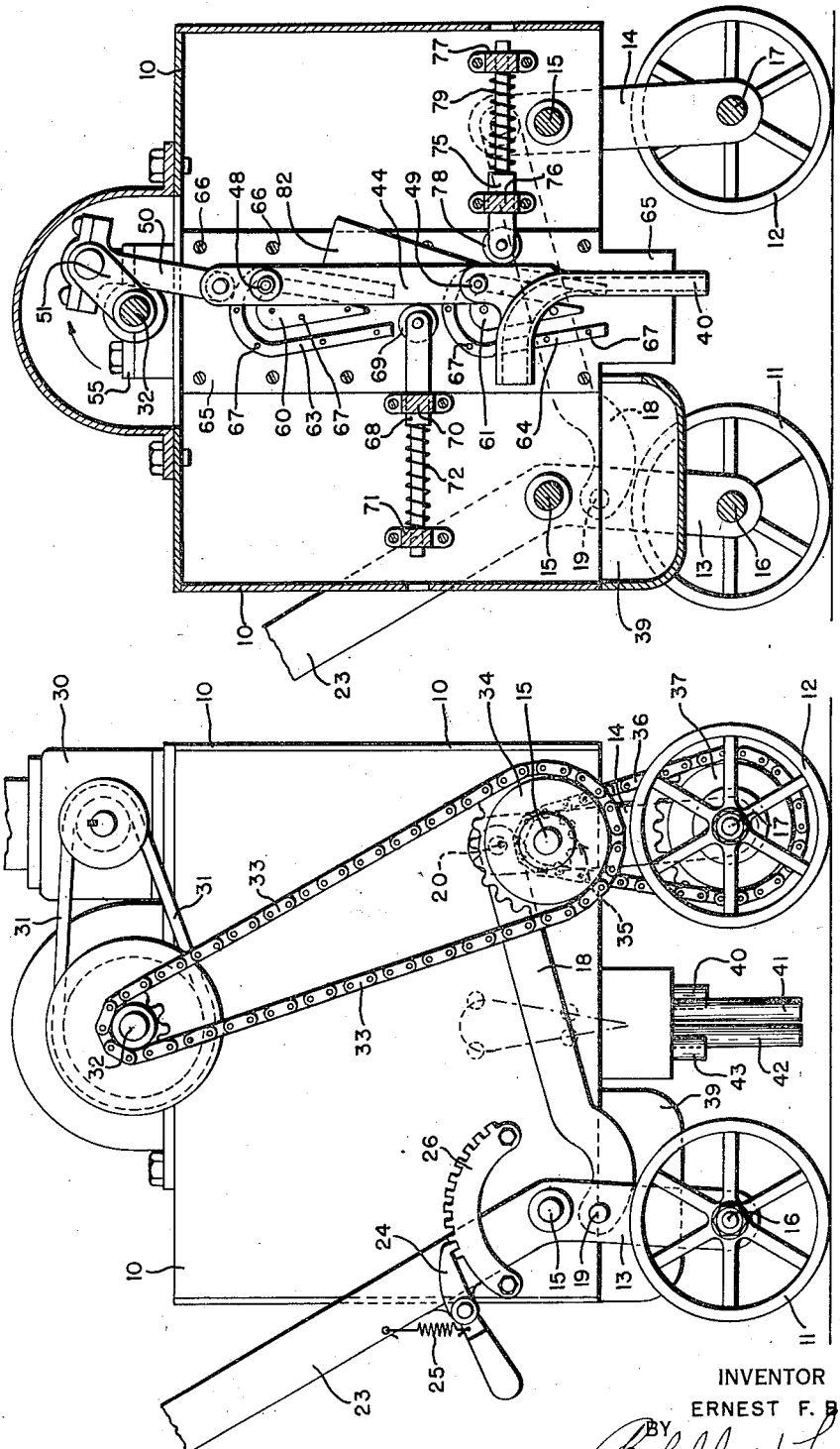
Figure 1 is a side elevation of the turf cutter showing the wheel supporting structure and the driving connection between the wheels for the turf cutter and the reciprocating means which drives the turf punches.
Figure 2 is a section through the frame of the turf cutter taken on line 2—2 of Figure 3, but with the reciprocating frame in a different position than shown in that view, namely in Figure 3 the reciprocating frame is retracting, whereas in Figure 2 it is descending.

The turf cutter is provided with a main frame or carriage 10 which is mounted upon wheels 11 and 12. If desired, means may be provided to raise and lower the main frame so that turf punches, to be described, may be raised above operative position, or selectively lowered to any operative position within the range of the machine. It is clear that this means may be dispensed with, although it enables the machine to selectively vary the depth of the holes in the turf. To accomplish this result, each wheel 11 is mounted upon an axle 16 and the axle is mounted upon a pair of arms 13, one of which is on each side of the main frame. Each wheel 12 is secured to an axle 17 and the axle is mounted upon a pair of arms 14, one of which is on each side of the main frame. Each arm is swingably secured to the main frame by means of a pivot 15.

A connecting link 18 has one end thereof secured to a pivot 19 upon the arm 13 on one side of the main frame 10, and the other end thereof secured to a pivot 20 upon the arm 14 upon the same side of the main frame. A similar connecting link operatively joins the arms 13 and 14 upon the other side of the main frame. These connecting links enable the two sets of wheels 11 and 12 to operate simultaneously to lower the main frame or carriage to operating position close to the ground, or to raise the same above operative position where turf punches, to be described, are above the ground. In the raised position, the turf cutter can be moved where desired without the punches being low enough to engage the ground. Under the action of the connecting link 18, when the arms 13 are swung outwardly to the left as viewed in Figure 1, the arms 14 and the wheels 12 are swung outwardly to the right.

A handle 23 preferably forms an extension to each arm 13 so that raising and lowering of the main frame 10 may be easily accomplished. The handle preferably carries a pawl 24 which is impelled by a spring 25 into the notches of a notched segment 26. The pawl and segment are used to retain the wheel arms and the wheels in raised position, or any selected lower position, so that the depth of the hole to be cut into the turf may be selected as desired.

The turf cutter may be driven by any suitable means such as a gas engine 30 which is shown connected by the belt 31 to the shaft 32 of a reciprocating means which will be described hereinafter. The shaft 32 is operatively connected with one of the wheels 12 by a chain drive which includes a chain 33 which drives a sprocket 34 carried upon the pivot 15. Another sprocket 35 is carried by the pivot 15 which is connected by a chain 36 to a sprocket 37 which is secured to the axle 17 carrying the wheels 12. The second chain 36 with its sprockets enables swinging of the arm 14 and consequently raising and lowering of the frame without affecting the driving connection between the shaft 32 and the wheels 12. A chain drive is provided between the shaft 32 and the wheels 12 so that the wheels will rotate a predetermined portion of a revolution for each revolution of the shaft 32. In other words, for each revolution of the shaft 32, the turf cutter will advance a predetermined distance over the ground.

The turf cutter carries a plurality of turf punches which are mounted to operate in pairs. The turf cutter described herein is shown as being provided with two punches acting together as a unit and four pairs of turf punches 40, 41, 42 and 43. It is to be understood that any number of punches may be used acting together as a unit, and any number of units may be used on the machine.

The turf punches are preferably tubular with sharpened ends, and may have their upper ends so constructed that they form outlets which extend laterally for ready discharge of the cores of turf and soil cut by the punches. A punch is or a pair of punches are projected downwardly into the soil of a green so that each cuts a tubular core. The tubular core adheres within the punch during the retracting movement, and when a second cut is made, the newly formed core pushes the previous core upwardly and outwardly of the turf punch into a receptacle 39.

Each pair or unit of turf punches 40, 41, 42 and 43 is preferably secured to a reciprocating frame 44, 45, 46 and 47, respectively. Since each of these reciprocating frames is identical, the reciprocating frame 44 for the pair of punches 40 will be described as illustrative of the construction of each of the reciprocating frames. Each reciprocating frame has a pair of cam engaging means such as rollers 48, and spaced therefrom is a second pair of cam engaging means or rollers 49. The upper end of each reciprocating frame is pivotally connected with a connecting rod 50 which is in turn connected with a crank 51. A crank 52, 53 and 54 is provided, respectively, for each of the other reciprocating frames 45, 46 and 47 for reciprocating their respective turf punches 41, 42 and 43 carried thereby.

The cranks 51, 52, 53 and 54 are spaced uniformly around a 360° angle so that the pairs of punches operate alternately or in timed sequence. In this way there are never more than two punches being projected downwardly into the ground at one time, so that a minimum horsepower motor 30 is needed. This also aids in providing greater smoothness in operation of the machine. The cranks 51, 52, 53 and 54 form a crank shaft which is the reciprocating means 32 for projecting the punches downwardly and thereafter raising them to retracted position. The crank shaft is merely illustrative of any form of reciprocating means which may be used to reciprocate the reciprocating frames and their respective punches. The crank shaft is rotatably mounted upon the main frame 10 by suitable bearings 55.

Means are carried by the main frame 10 which cooperate with the rollers 48 and 49 upon the reciprocating frames 44, 45, 46 and 47 for mounting the turf punches, and particularly the reciprocating frames, for vertical reciprocation and for horizontal movement, so that the turf punches remain in the same vertical plane with respect to the ground during the downward punching movement thereof and during the upward retractile movement while the main frame or carriage moves slowly forward. This mounting means includes cam means which are identical for each reciprocating frame, and hence the cam means for the reciprocating frame 44 will be described as illustrative of the cam means for each of the reciprocating frames.

Two pairs of cams are preferably provided for each reciprocating frame which include an upper pair of cams 60 and a lower pair of cams 61, both of which are preferably in vertical alignment with the reciprocating means or crank shaft 32. When the cam means are in such vertical alignment with the reciprocating means, the cams will have a uniform or symmetrical shape, as shown. A cam 60 is provided upon each side of the upper end of the reciprocating frame 44 for engagement by the rollers 48. A similar pair of cams 61 is provided for the lower end of the reciprocating frame, one cam being located upon each side of the reciprocating frame. Each cam of the pair is engaged by a roller 49 carried on each side of the reciprocating frame.

The cams 60 and 61, or the cam means, retain their respective reciprocating frame and turf punches in vertical alignment throughout that portion of the reciprocating stroke when the turf punches are penetrating the ground and being retracted upwardly out of the holes which have been cut. The cam means also is so shaped that its respective reciprocating frame and turf punches remain in the same vertical plane so long as the lower ends of the turf punches are below the ground surface and when the turf cutter or main frame 10 moves slowly forward. In other words, the dimension across the widest portion of the cams 60 and 61, plus the diameter of one cam roller 48 or 49, is equal to the predetermined distance which the main frame 10 advances upon one complete reciprocating movement or upon one complete rotation of the crank shaft 32 or the crank 51. The cams 60 and 61 may be provided with outer cam strips 63 and 64 so that a cam groove is provided for the rollers 48 and 49, respectively.

The cam means are mounted upon the walls of the carriage or main frame 10 and particularly upon partitions 62, or other suitable structure within and forming part of the main frame. The cam means upon opposite sides of each reciprocating frame, in the structure illustrated, are carried upon a separate cam plate 65 which is removably secured to the partitions 62 in any suitable fashion, such as by screws 66, so that a plate and its cams may be removed for repair or replacement. The most convenient construction is to have each pair of cams upon each side of each reciprocating frame secured to or carried by a separate cam plate. The cams may be secured to the plates by any suitable means such as rivets 67. This construction provides two cam plates for each reciprocating frame and permits repair or replacement of any pair of cams without disturbing any other cam means or any other reciprocating frame.

Figure 4:
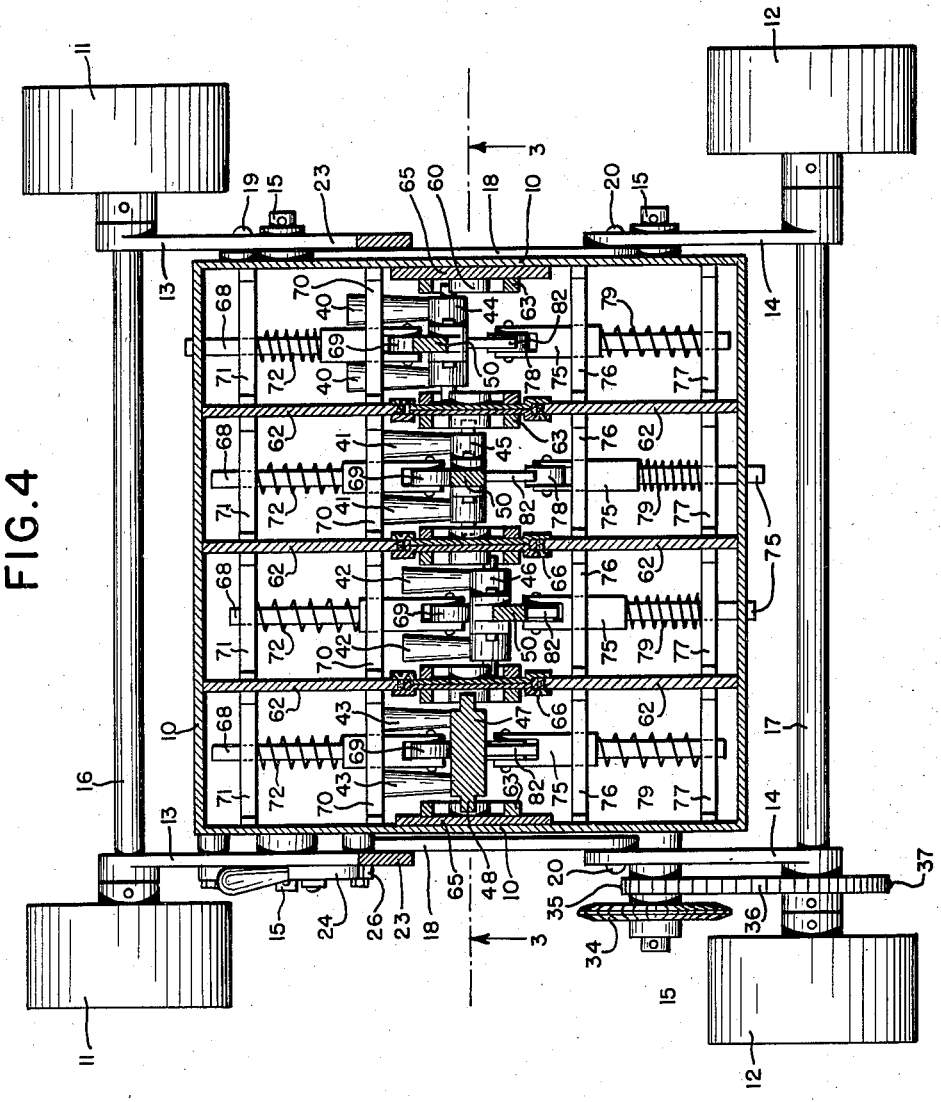
Figure 4 is a horizontal section through the turf cutter, taken on line 4—4 of Figure 3.

Means is provided to shift the turf punches 40, as well as the reciprocating frame 44, forward with respect to the main frame 10, that is to the right as viewed in Figure 2, and to a new advanced position for another hole punching operation at the top of the reciprocatory stroke. This means may be and is shown as spring means which presses the reciprocating frame 44 at least past the midpoint of the top of the cams 60 and 61 and preferably presses it substantially across the top and broad portion of the cams 60 and 61, respectively. The spring means includes a plunger 68 having a roller 69 upon the end thereof which engages the flat surface of the reciprocating frame 44. The plunger is mounted for horizontal movement in the brackets 70 and 71 which are secured in any suitable manner to the main frame 10, or particularly to the partitions 62 carried by the main frame. A spring 72 presses against a shoulder upon the plunger 68 and impels the same to the right as viewed in Figure 2, or downwardly as viewed in Figure 4.

It will be observed that when the reciprocating frame 44 and the turf punches 40 reach substantially their upper or retracted position, the spring 72 presses the plunger 68 to the right which in turn presses the reciprocating frame 44 to the right over the broad or upper end of the cams 60 and 61 to the position shown in Figure 2 where the reciprocating frame begins its next downward movement. It should also be noted that when the reciprocating frame is adjacent the upper end of its upper stroke, it has moved to the left relatively to the main frame 10 so that the plunger 68 is forced to the left thereby, which compresses the spring 72 and increases the power thereof to propel the reciprocating frame 44 and its turf punches to the right when they reach the top of their stroke.

A second means, which may be and is shown as a spring means, propels the reciprocating frame 44 and hence the turf punches to the left, as shown in Figure 2, at the bottom of their reciprocating stroke in order to assure that the cam engaging rollers 48 and 49 pass to the left side of the point at the bottom of the respective cams 60 and 61. This second spring means assures that the reciprocating frame 44 will move upwardly in the left-hand cam track, or upon the left-hand side of the respective cams 60 and 61 as viewed in Figure 2. This second spring means includes a plunger 75 which is mounted for horizontal movement in the brackets 76 and 77. The brackets are secured to the main frame 10 or particularly to the partitions 62 in any suitable manner. A roller 78 is mounted upon the end of the plunger. A spring 79 engages a shoulder upon the plunger 75 and propels it to the left as viewed in Figure 2, or upwardly as viewed in Figure 4.

A cam or inclined plane 82 is carried by the reciprocating frame 44, and the roller 78 of the plunger 75 rides along this cam or inclined plane as the reciprocating frame moves downwardly and upwardly. Preferably the cam or inclined plane has an angularity greater than the angle of the side of the cams 60 and 61. The purpose of the cam 82 is to retain the power or compression in the spring 79, or preferably to increase the power in the spring, as the reciprocating frame moves downwardly. In other words, if the angle of inclination of the cam 82 is equal to the angle of inclination of the cams 60 and 61, then the power or compression in the spring 79 would remain constant during the downward movement of the reciprocating frame 44. If, however, the angularity of the cam 82 is greater than the angularity of the sides of the cams 60 and 61 as shown, then the compression or power of the spring 79 increases with the downward movement of the reciprocating frame 44.

The cam or inclined plane 82 is necessary with the spring means because ordinarily the spring 79 will have no or little compression therein, so that when the spring 72 pushes the reciprocating frame 44 to the right at the upper portion of the stroke, as viewed in Figure 2, the spring 72 will not have to push the reciprocating frame 44 and its turf punches to the right against any tension or any substantial tension in the spring 79. It is essential, however, that the spring 79 have sufficient power at the bottom of the reciprocating stroke in order to overcome the tension of the spring 72 and to assure that the cam rollers 48 and 49 pass around the point at the bottom of the cams 60 and 61 so that the upward or retracting movement of the reciprocating frame 44 will travel along the left-hand side of the cams.

Ordinarily, because of the forward movement of the main frame or carriage 10 and because the turf punches 40 are held in the holes which they have punched in the ground, the reciprocating frame 44 and the turf punches 40 will cause the cam rollers 48 and 49 to pass to the left or rear side of the lower pointed ends of the cams 60 and 61. The second spring means is provided principally for the times when the carriage or main frame 10 is raised and the punches are not being projected into the ground. It is at this time that the second spring means particularly aids in the proper operation of the machine. However, so long as the entire machine operates, even when the turf punches are raised so that they do not engage the ground, there is a need for the second spring means in order to assure that the reciprocating frame will move downwardly upon one side of the cams 60 and 61 and upwardly upon the other side thereof. It will be apparent that this operation is not essential so long as the turf punches are not being projected in the ground because it is only when the turf punches are punching holes that it is essential that they remain in the same vertical plane while the turf cutting machine moves forward.

It should be noted that the first spring means, which includes the plunger 68, is positioned so that it engages approximately the midpoint of the reciprocating frame 44, or approximately midway between the cam rollers 48 and 49 when they are at the top of their reciprocating stroke. The second spring means, which includes the plunger 75, is lower than the plunger 68 because it is positioned to engage the reciprocating frame 44 at approximately its midpoint or approximately midway between the cam rollers 48 and 49 when they are at the bottom of their reciprocating stroke, since this is the position or time in the sequence of operations that this second spring means performs its function of pressing the reciprocating frame 44 and its turf punches to the left or rearwardly.

This invention is presented to fill a need for improvements in a turf cutter. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A turf cutter comprising a main frame, wheels on which the main frame is movable over the ground, turf punches, reciprocating means connected with the turf punches to project the same downwardly and thereafter retract them upwardly, a driving connection between the wheels and the reciprocating means so that for each complete reciprocation of the turf punches the wheels advance the main frame a predetermined distance, means carried by the main frame and mounting the turf punches for vertical reciprocation and relative horizontal movement including cam means controlling the turf punches so that the latter remain in the same vertical plane during forward movement of the main frame, and means propelling the turf punches to an advanced position with respect to the cam means and the main frame when in retracted position.

2. A turf cutter comprising a main frame, wheels on which the main frame is movable over the ground, turf punches, reciprocating means connected with the turf punches to project the same downwardly and thereafter retract them upwardly, a driving connection between the wheels and the reciprocating means so that for each complete reciprocation of the turf punches the wheels advance the main frame a predetermined distance, means mounting the turf punches for vertical reciprocation and relative horizontal movement including a pair of cams in vertical alignment and controlling the turf punches so that the latter remain in the same vertical plane during forward movement of the main frame, and spring means propelling the turf punches to an advanced position with respect to the cam means when in retracted position.

3. A turf cutter comprising a main frame, wheels on which the main frame is movable over the ground, turf punches arranged in units, reciprocating means connected with each unit of turf punches to project the same downwardly and thereafter retract them upwardly and in spaced sequence with the other units of turf punches, a driving connection between the wheels and the reciprocating means so that for each complete reciprocation of the turf punches the wheels advance the main frame a predetermined distance, means carried by the main frame and mounting the turf punches for vertical reciprocation and relative horizontal movement including a pair of cams upon each side of each unit of turf punches and in vertical alignment below the reciprocating means, a spaced roller for each cam carried by the turf punches and controlling the latter so that they remain in the same vertical plane during vertical reciprocation thereof and during the forward movement of the main frame, and spring means propelling the turf punches to an advanced position with respect to the cam means and main frame when in retracted position.

4. A turf cutter comprising a main frame, wheels on which the main frame is movable over the ground, turf punches, reciprocating means connected with the turf punches to project the same downwardly and thereafter retract them upwardly, a driving connection between the wheels and the reciprocating means so that for each complete reciprocation of the turf punches the wheels advance the main frame a predetermined distance, means carried by the main frame and mounting the turf punches for vertical reciprocation and relative horizontal movement including cam means below the reciprocating means having a point at the bottom and being broad at the top, the cam means controlling the turf punches so that the latter remain in the same vertical plane during forward movement of the main frame, spring means propelling the turf punches to an advanced position across the broad top of the cam means when in retracted position, and means propelling the turf punches to the other side of the point of the cam means at the bottom of the stroke of the turf punches.

5. A turf cutter comprising a main frame, wheels on which the main frame is movable over the ground, a reciprocating frame having turf punches mounted thereupon, reciprocating means connected with the reciprocating frame to project the turf punches downwardly and thereafter retract them upwardly, a driving connection between the wheels and the reciprocating means so that for each complete reciprocation of the turf punches the wheels advance the main frame a predetermined distance, means carried by the main frame and mounting the reciprocating frame and the turf punches for vertical reciprocation and relative horizontal movement including cam means below the reciprocating means having a point at the bottom and being broad at the top, the cam means controlling the turf punches so that the latter remain in the same vertical plane during forward movement of the main frame, spring means propelling the turf punches to an advanced position across the broad top of the cam means when in retracted position, and means propelling the reciprocating frame and the turf punches carried thereby to the other side of the point of the cam means at the bottom of the stroke including inclined plane means carried by the reciprocating frame, and a second spring means engaging the aforesaid inclined plane means.

6. A turf cutter comprising a main frame, wheels on which the main frame is movable over the ground, a plurality of reciprocating frames having turf punches mounted thereupon, reciprocating means operating in timed sequence and connected with each reciprocating frame to project the latter and the turf punches carried thereby downwardly and thereafter retract them upwardly, the reciprocating means projecting the reciprocating frames downwardly at different times, a driving connection between the wheels and the reciprocating means so that for each complete reciprocation of the turf punches the wheels advance the main frame a predetermined distance, means carried by the main frame and mounting each reciprocating frame and its turf punches for vertical reciprocation and relative horizontal movement including removable plates upon each side of each reciprocating frame, cam means carried by each removable plate and below the reciprocating means, the cam means having a point at the bottom and being broad at the top, cam engaging means carried by each reciprocating frame and engaging its respective cam means for controlling the reciprocating frame and its turf punches so that the latter remain in the same vertical plane during forward movement of the main frame, and means propelling each reciprocating frame and the turf punches to an advanced position across the broad top of the cam means when in retracted position.

7. A turf cutter comprising a main frame having partitions therein, wheels on which the main frame is movable over the ground, a plurality of reciprocating frames having turf punches mounted thereupon, reciprocating means operating in timed sequence and connected with each reciprocating frame to project the latter and turf punches carried thereby downwardly and thereafter retract them upwardly, a driving connection between the wheels and the reciprocating means so that for each complete reciprocation of the turf punches the wheels advance the main frame a predetermined distance, means carried by the main frame and mounting each reciprocating frame and its turf punches for vertical reciprocation and relative horizontal movement including removable plates upon each side of each reciprocating frame and removably secured to the partitions, cam means carried by each removable plate and below the reciprocating means, the cam means having a point at the bottom and being broad at the top, cam engaging means carried by each reciprocating frame and engaging its respective cam means for controlling the reciprocating frame and its turf punches so that the latter remain in the same vertical plane during forward movement of the main frame, and means propelling each reciprocating frame and its turf punches to an advanced position across the broad top of the cam means when in retracted position.

8. A turf cutter comprising a main frame, wheels on which the main frame is movable over the ground, a reciprocating frame having turf punches mounted thereupon, reciprocating means connected with the reciprocating frame to project the turf punches downwardly and thereafter retract them upwardly, a driving connection between the wheels and the reciprocating means so that for each complete reciprocation of the turf punches the wheels advance the main frame a predetermined distance, means carried by the main frame and mounting the reciprocating frame and the turf punches for vertical reciprocation and relative horizontal movement including two pairs of cams below the reciprocating means and each cam having a point at the bottom and being broad at the top, one pair of cams controlling the upper end of the reciprocating frame and the other pair of cams controlling the lower end of the reciprocating frame so that the reciprocating frame and the turf punches remain in the same vertical plane during forward movement of main frame, spring means propelling the turf punches to an advanced position across the broad tops of the cams when in retracted position, and means propelling the reciprocating frame to the other side of the point of the cams at the bottom of the stroke.

9. A turf cutter comprising a main frame, wheels on which the main frame is movable over the ground, swinging arms upon which the wheels are mounted upon the main frame to raise and lower the latter to and from turf cutting position, turf punches, reciprocating means connected with the turf punches to project the same downwardly and thereafter retract them upwardly, a driving connection between the wheels and the reciprocating means so that for each complete reciprocation of the turf punches the wheels advance the main frame a predetermined distance, means carried by the main frame and mounting the turf punches for vertical reciprocation and relative horizontal movement including cam means controlling the turf punches so that the latter remain in the same vertical plane during forward movement of the main frame, and spring means propelling the turf punches to an advanced horizontal position upon the other side of the cam means when in retracted position.

10. A turf cutter comprising a main frame, wheels on which the main frame is movable over the ground, a reciprocating frame having turf punches mounted thereupon, reciprocating means connected with the reciprocating frame to project the turf punches downwardly and thereafter retract them upwardly, a driving connection between the wheels and the reciprocating means so that for each complete reciprocation of the turf punches the wheels advance the main frame a predetermined distance, means carried by the main frame and mounting the reciprocating frame and the turf punches for vertical reciprocation and relative horizontal movement including cam means below the reciprocating means having a point at the bottom and being broad at the top, the cam means controlling the turf punches so that the latter remain in the same vertical plane during forward movement of the main frame, spring means engaging each reciprocating frame approximately at its center when in retracted position and propelling the same with its turf punches to an advanced position across the broad top of the cam means when in this position, and means propelling each reciprocating frame and its turf punches to the other side of the point of the cam means at the bottom of the stroke including inclined plane means carried by and having a high point approximately at the center of the reciprocating frame, and a second spring means engaging the aforesaid high point of the inclined plane means when the reciprocating frame is in its down position.

11. A turf cutter comprising a main frame, wheels on which the main frame is movable over the ground, a reciprocating frame having turf punches mounted thereupon, reciprocating means connected with the reciprocating frame to project the turf punches downwardly and thereafter retract them upwardly, a driving connection between the wheels and the reciprocating means so that for each complete reciprocation of the turf punches the wheels advance the main frame a predetermined distance, means carried by the main frame and mounting the reciprocating frame and the turf punches for vertical reciprocation and relative horizontal movement including cam means below the reciprocating means having a point at the bottom and being broad at the top, spaced cam rollers carried by each reciprocating frame and engaging its respective cam means for controlling the turf punches so that the latter remain in the same vertical plane during forward movement of the main frame, spring means engaging the reciprocating frame approximately midway between the spaced cam rollers when at the top of its stroke for propelling the turf punches to an advanced position across the broad top of the cam means when in retracted position, and means propelling each reciprocating frame and the turf punches carried thereby to the other side of the point of the cam means at the bottom of the stroke including inclined plane means carried by and having an inclination greater than the cam means with a high point thereof approximately at the midpoint between the cam rollers upon the reciprocating frame, and a second spring means engaging the aforesaid inclined plane means when the reciprocating frame is in its down position.

12. A turf cutter comprising a main frame, wheels on which the main frame is movable over the ground, turf punches, reciprocating means connected with the turf punches to project the same downwardly and thereafter retract them upwardly, a driving connection betwen the wheels and the reciprocating means so that for each complete reciprocation of the turf punches the wheels advance the main frame a predetermined distance, means carried by the main frame and mounting the turf punches for vertical reciprocation and relative horizontal movement including a removable plate upon each side of the turf punches, cam means carried by each plate and controlling the turf punches so that the latter remain in the same vertical plane during forward movement of the frame, and means propelling the turf punches to an advanced horizontal position with respect to the cam means when in retracted position.

13. A turf cutter comprising a main frame, wheels on which the main frame is movable over the ground, a plurality of units of turf punches, reciprocating means connected with the turf punches to project the same downwardly and thereafter retract them upwardly, a driving connection between the wheels and the reciprocating means so that for each complete reciprocation of the turf punches the wheels advance the main frame a predetermined distance, means carried by the main frame and mounting the turf punches for vertical reciprocation and relative horizontal movement including a removable and separate plate upon each side of each unit of turf punches, cam means carried by each plate and controlling the turf punches so that the latter remain in the same vertical plane during forward movement of the frame, and spring means propelling the turf punches to an advanced horizontal position with respect to the cam means when in retracted position.

14. A turf cutter comprising a main frame, wheels on which the main frame is movable over the ground, turf punches, crank shaft reciprocating means connected with the turf punches to project the same downwardly and thereafter retract them upwardly, a driving connection between the wheels and the reciprocating means so that for each complete reciprocation of the turf punches the wheels advance the main frame a predetermined distance, means carried by the main frame and mounting the turf punches for vertical reciprocation and relative horizontal movement including cam means controlling the turf punches so that the latter remain in the same vertical plane during forward movement of the main frame, and means propelling the turf punches to an advanced position with respect to the cam means and the main frame when in retracted position.

ERNEST F. BRANDES.